United States Patent [19]
Kumm

[11] Patent Number: 5,277,666
[45] Date of Patent: Jan. 11, 1994

[54] BELT TENSIONER

[75] Inventor: Emerson L. Kumm, Prescott, Ariz.

[73] Assignee: Kumm Industries, Inc., Prescott, Ariz.

[21] Appl. No.: 970,768

[22] Filed: Nov. 3, 1992

Related U.S. Application Data

[63] Continuation-in-part of Ser. No. 780,003, Oct. 21, 1991, abandoned.

[51] Int. Cl.⁵ .............................................. F16H 7/08
[52] U.S. Cl. .................................... 474/133; 474/135
[58] Field of Search ..................... 474/101, 109–111, 474/113–117, 133–138

[56] References Cited

U.S. PATENT DOCUMENTS

| | | | |
|---|---|---|---|
| 4,151,756 | 5/1979 | Binder et al. | 74/242.11 |
| 4,270,906 | 6/1981 | Kraft et al. | 474/135 |
| 4,283,182 | 8/1981 | Kraft | 474/110 |
| 4,355,991 | 10/1982 | Kraft | 474/110 |
| 4,411,638 | 10/1983 | Wilson | 474/135 |
| 4,464,146 | 8/1984 | Arthur | 474/133 |
| 4,466,803 | 8/1984 | Wilson | 474/138 |
| 4,473,362 | 9/1984 | Thomey et al. | 474/135 |
| 4,525,153 | 6/1985 | Wilson | 474/138 |
| 4,536,172 | 8/1985 | Burris et al. | 474/135 |
| 4,539,001 | 9/1985 | Okabe | 474/138 |
| 4,563,167 | 1/1986 | Foster | 474/135 |
| 4,571,223 | 2/1986 | Malloy | 474/133 |
| 4,601,683 | 7/1986 | Foster | 474/135 |
| 4,634,408 | 1/1987 | Foster | 474/135 |
| 4,696,664 | 9/1987 | Wilson | 474/138 |
| 4,790,796 | 12/1988 | Okabe et al. | 474/110 |
| 4,798,563 | 1/1989 | Okabe et al. | 474/110 |
| 4,874,352 | 10/1989 | Suzuki | 474/110 |
| 4,881,927 | 11/1989 | Suzuki | 474/110 |
| 4,908,007 | 3/1990 | Henderson | 474/135 |
| 4,909,777 | 3/1990 | Unobe et al. | 474/110 |
| 4,940,447 | 7/1990 | Kawashima et al. | 474/110 |
| 4,950,209 | 8/1990 | Kawashima et al. | 474/138 |
| 5,087,225 | 2/1992 | Futami et al. | 474/110 |
| 5,190,502 | 3/1993 | Gardner et al. | 474/135 |

Primary Examiner—Thuy M. Bui
Attorney, Agent, or Firm—Richard G. Harrer; Charles E. Cates

[57] ABSTRACT

A belt tensioner employing helical compression springs in series arrangement in a housing located on a support structure to rotate another structure pivotally mounted on the support structure. An idler pulley is located on the rotatable structure and bears against a belt to both tension it and dampen vibrations. The helical compression springs operate on a plate rigidly attached to a movable shaft, which shaft bears directly or preferably indirectly through a thrust linkage on a shoulder of the rotatable structure. The springs, a thrust assembly and shaft are all mounted in a housing which is substantially filled with liquid which dampens the movement of the rotatable structure by the liquid being forced to flow through a restriction in the thrust assembly as it passes from one chamber to another inside the housing. The constant diameter shaft passes through the housing and its end cap, it being sealed hydraulically at each end. This permits shaft movement to occur without any volume change inside the housing. The rotatable structure is pivotally mounted to the support structure with its rotational axis being displaced and perpendicular to the spring thrust axis. The pressure of the liquid within the tensioner housing due to the thermal expansion of the liquid can be reduced by employing a closed cell elastomeric foam insert in one of the liquid filled chambers of the housing.

24 Claims, 6 Drawing Sheets

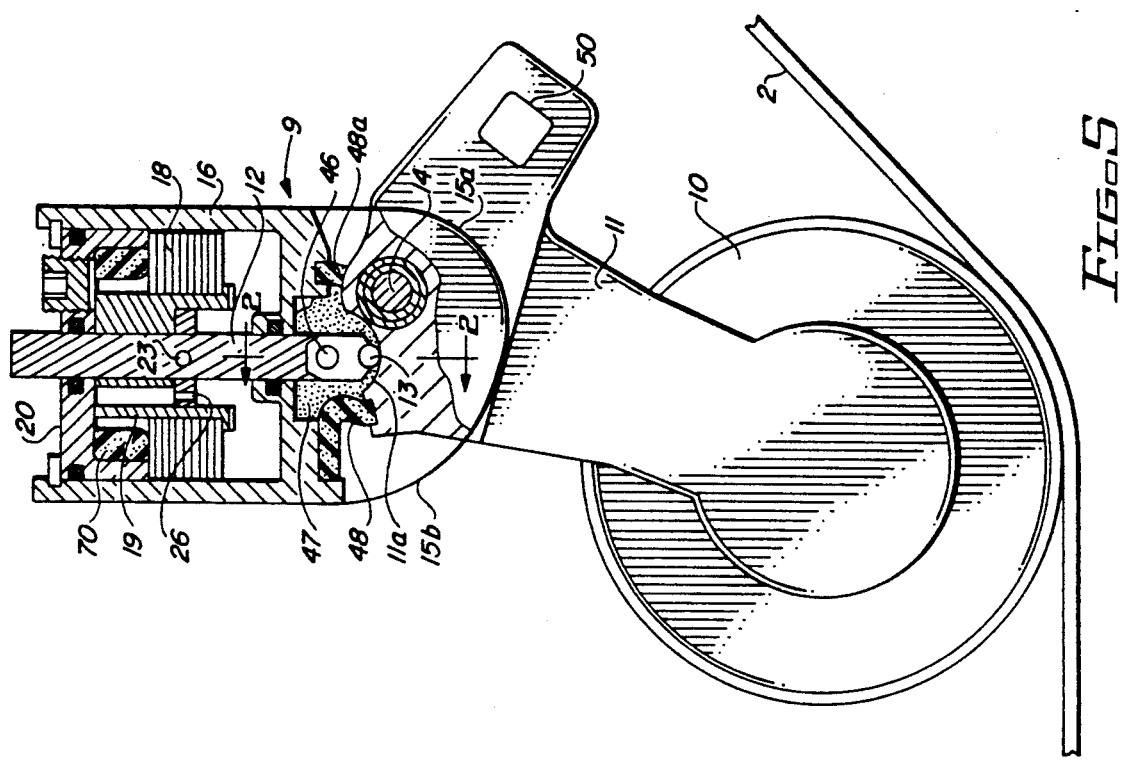
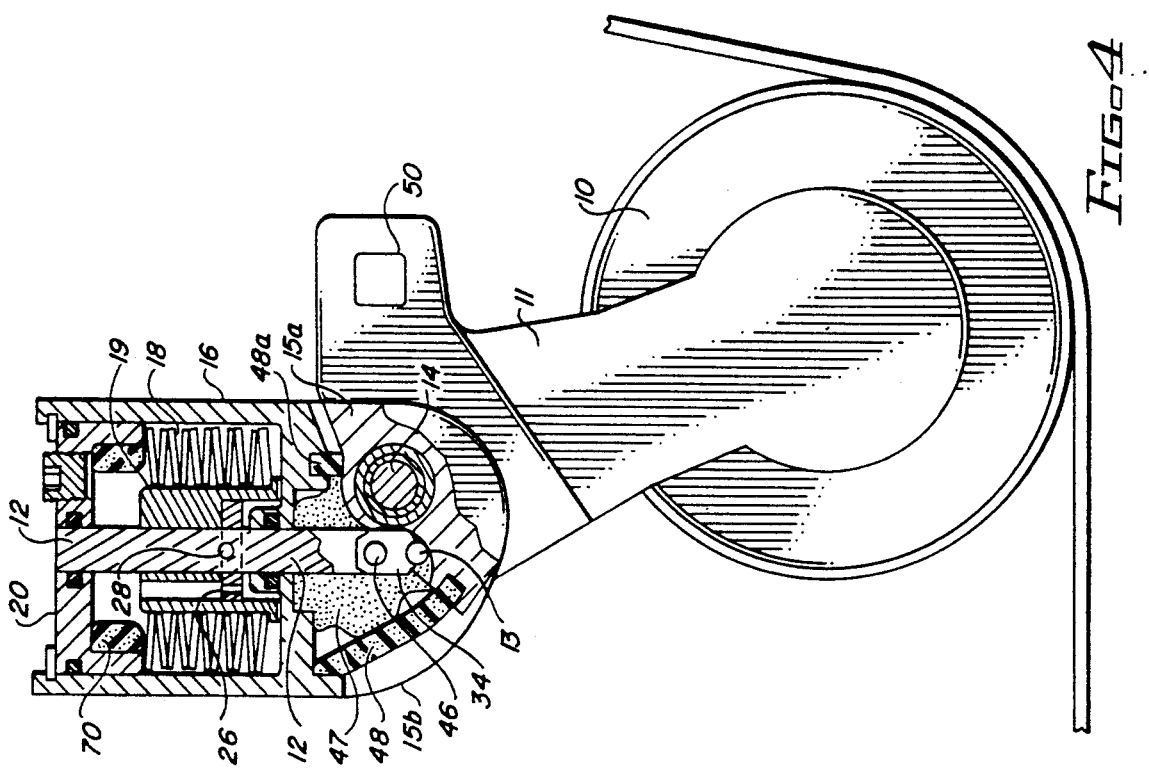

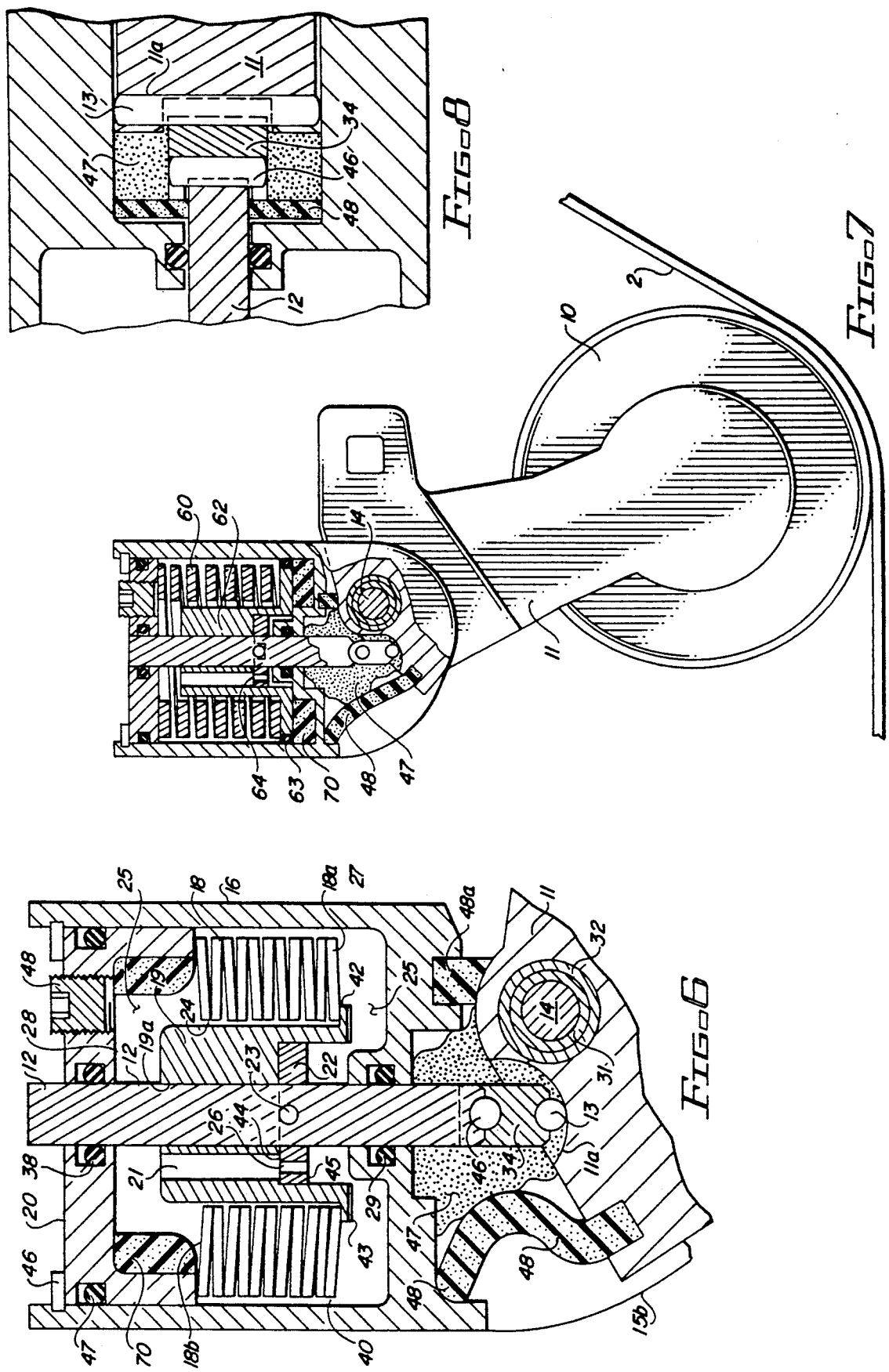

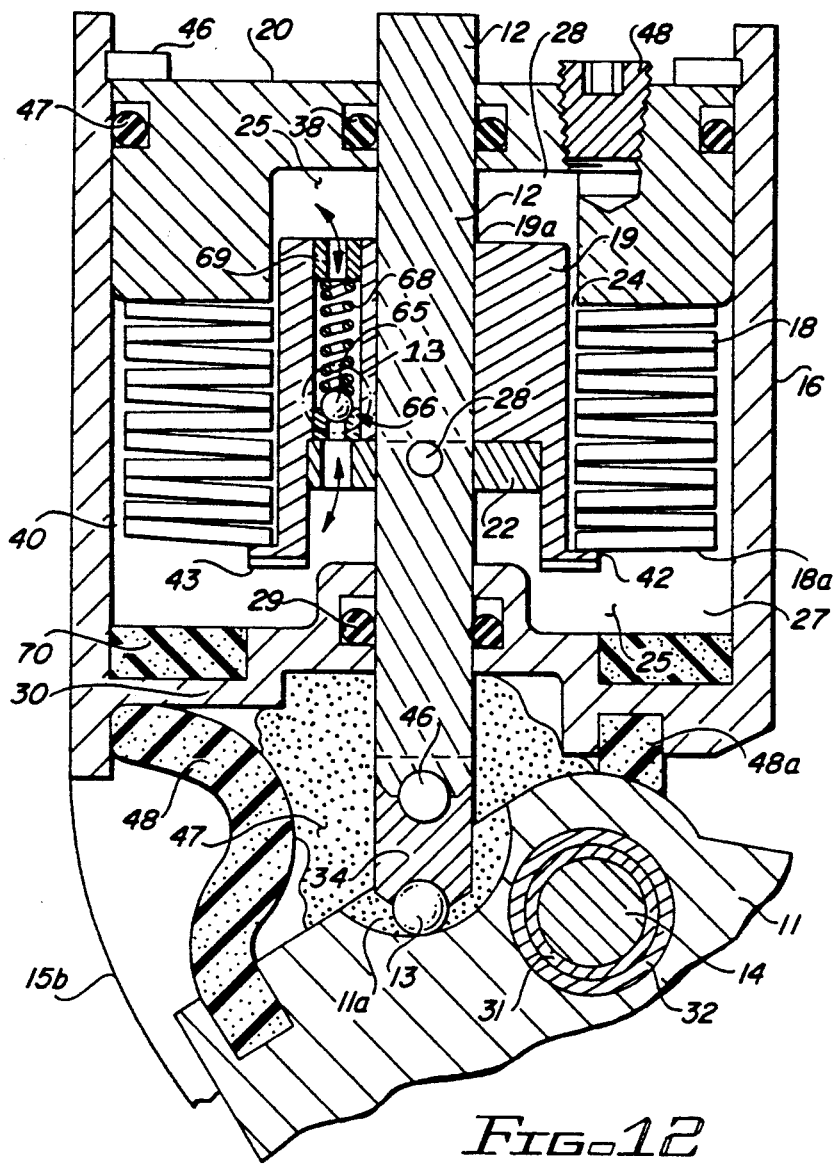

BELT TENSIONER

This application is a continuation-in-part of application Ser. No. 07/780,003 filed Oct. 21, 1991 now abandoned.

FIELD OF THE INVENTION

This invention relates to belt tensioners in general and more specifically, to a belt tensioner of the type which automatically maintains a relatively constant desired tension on a serpentine accessory power transmission belt or drive belt and which substantially reduces successive belt vibration and oscillation through effective dampening means.

BACKGROUND OF THE INVENTION

In the automotive field, a power transmission belt or drive belt is typically used to drive one or more accessories from the engine crankshaft. There is now a trend in the automotive industry to employ a single drive belt or so-called "serpentine" belt to drive all the accessories rather than employ several or more belts and pulleys. Thus, in a typical arrangement, a single belt can be used to drive the air conditioning compressor, air pump, power steering, alternator, fan and water pump and power brake vacuum pump from the crankshaft pulley.

In order to drive the accessories without substantial belt slip and critical belt wear, it is necessary that the belt be tensioned appropriately for the torque transmitted at each of the accessory pulleys. However, even though the belt may be initially tensioned adequately, with operation, the belt is subject to some wear and some elongation. One significant cause of serpentine drive belt failure is degradation due to heat caused by belt-slip which is usually due to insufficient tension on the belt. Thus a fixed position pulley arrangement is usually inadequate to maintain proper belt tension since any belt wear or elongation has a drastic effect on belt tension. This is particularly true of high strength belts using high modulus cords which have very little extension over their operating range. The problem of maintaining proper tension is also compounded by the long length of the serpentine belt operating on many accessories. Furthermore, the torsional vibration of the engine crankshaft together with the torque changes in the accessories and the fundamental frequency of the spring operated belt tensioner can lead to large vibrations of the transmission belt which may be critical.

A number of belt tensioners have been designed and applied in an attempt to mitigate and resolve the above problems. Belt tensioners, in general, comprise an arm with a belt engaging pulley mounted on one end thereof and with the other end pivoted to the engine block. A tensioning means maintains the tension on the arm in the direction of belt stretch so that the pulley is continuously and yieldably engaged with the belt to move therewith as the belt stretches. It is desirable that such a tensioning means maintain a continuous or constant tension on the belt. It is also desirable that the tensioner have a means for dampening oscillations or other vibrations in the belt.

Approaches that continue to apply tension to the belt with an increase in belt length and allegedly provide dampening for belt vibration are shown in Foster, U.S. Pat. Nos. 4,563,167; 4,601,683 and 4,634,408; by Burris in U.S. Pat. No. 4,536,172; and by Thomey et al in U.S. Pat. No. 4,473,362. All of the foregoing use a spiral spring in combination with hydraulic fluid vibration dampening or other vibration dampening element. Hydraulic positioning elements are employed in Kraft, U.S. Pat. No. 4,355,991 to pivot a tensioner pulley; in Spraul, U.S. Pat. No. 4,283,182 to rotate the tensioner pulley off a cam; and in Wilson, U.S. Pat. No. 4,466,803 a more involved hydraulically operated piston on a bellows is used to position the tensioner. Malloy in U.S. Pat. No. 4,571,223 discloses a rather elaborate eccentric cam and straps to vary the pulley with constant tension and Arthur, U.S. Pat. No. 4,464,146 discloses use of an elastomeric spring having lower energy density in place of a steel spiral torsion spring.

Disk springs, also known as Belleville spring washers, are employed by Kraft in U.S. Pat. No. 4,270,906 to move a cam plate on the axis of the disk springs. The linear motion of this cam plate is converted into a rotary motion of an arm carrying the belt tensioning idler pulley by interacting against another cam to rotate it by a ramp type of action. Only a portion of the axial force from the disk springs (amount available dependent on the ramp angle) is available to give torque on the arm. Large variable frictional losses are probably involved due to the relative movement of the cam surfaces. Additionally, no controlled hydraulic dampening means are disclosed and this approach requires a relatively large axial space to accommodate the disk springs and other difficulties are involved with the rather complicated cam plates.

Wilson describes in U.S. Pat. Nos. 4,411,638 and 4,525,153 a direct operating tensioner that uses Belleville spring washers in series arrangement in combination with a separate hydraulic chamber with bypass flow restriction to give a special dampening characteristic. Wilson shows the same direct operating tensioner in U.S. Pat. No. 4,696,664 and discloses the use of Belleville spring washers having a cone height to thickness ratio of 1.4 to 1.8 to obtain substantially constant force over a 100 to 50% deflection range and a cone height to thickness ratio of 1.6 to 3.0 to obtain a negative load deflection relation—spring force decreases as the spring is compressed. However, a series arrangement of Belleville spring washers having a cone to disk thickness ratio larger than about 1.4 are subject to erratic deflections when operating in the negative load deflection regime. This is due to slight differences in the load versus deflection characteristic of individual Belleville washers due to manufacturing tolerances. If one of a series of a negative load deflection characteristic Belleville washers deflect slightly more than the others, it will continue to collapse to a flat or possibly reversed cone condition while the remaining Belleville washers must adjust to obtain the required overall deflection. Other Belleville washers may subsequently deflect resulting in a highly erratic belt tensioning. Such erratic operation is accentuated by belt oscillations due to other causes.

In Binder et al U.S. Pat. No. 4,151,756 bimetallic disk springs are used to tension gear belts by moving a tensioner pulley. The objective and means involves bimetallic disks which function in a different way than from the conventional Belleville or disk springs. The bimetallic disks require changes in their temperature to vary their axial position and force. A relatively complex, large tensioning structure is shown in Binder and does not appear to employ the basic advantages of Belleville or disk springs, that is, the ability to deliver large forces with relatively small movements.

Spiral torsion springs used in many tensioners require more material and volume to generate a given torque as compared to disk or Belleville springs. Disk springs can absorb and deliver more energy per unit weight as compared to spiral torsion springs. However, the movement of disk springs is quite small compared to the spiral torsion spring. Another major requirement for a belt tensioner as applied to power transmission belts on reciprocating engines involves dampening of belt oscillations due to engine torsional vibrations and belt load variations. Some belt tensioners described in the art employ other viscous fluid and frictional dampeners as well as separate hydraulic dampeners. Such devices involve additional equipment added to the tensioner and are difficult to adjust appropriately for varying installations and operations.

A number of tensioners have been patented for tensioning toothed belts and chain drives and hydraulically dampening the belt vibrations. A typical arrangement is shown in Kawashima et al U.S. Pat. No. 4,940,447 and Kawashima et al U.S. Pat. No. 4,950,209 where a piston forced by the pulley on the belt enters one side of a chamber to pressurize oil located at the opposite end of the chamber. A check valve is used to give a substantially unidirectional dampening characteristic with the dampening away from the belt and opposed to the direction of the spring force being much larger than the opposite direction. Since the piston does not pass through the chamber, any movement of the piston into the chamber requires oil flow from the pressure chamber to a reservoir chamber which contains a substantial air volume that can be displaced or pressurized by the oil. The check valve then gives very little dampening toward the belt in the direction of the spring force allowing the oil to flow freely in one direction. The high pressure oil from the high pressure chamber to the reservoir chamber leaks through the very small clearance between the piston and its housing to permit overall movement of the piston against a helical compression spring, which tensions the belt. Such a device is subject to cavitation problems in the oil of the pressure chamber and wear of piston and housing causing dampening variations. Also, a rather elongated structure is required to give the required belt takeup. A check valve is not used in a portion of Okabe U.S. Pat. No. 4,539,001 where a two piston system is employed with a unidirectional flow connection for oil dampening. Here, a spring keeps the oil under pressure at all times with vibration causing seal wear and external leakage. Okabe U.S. Pat. No. 4,790,796 uses two springs with a two piston system and a check valve to give a pressurized chamber for unidirectional dampening. Okabe U.S. Pat. No. 4,798,563 shows the addition of a bellows shaped elastic diaphragm in the reservoir chamber to replace the free piston. Suzuki U.S. Pat. Nos. 4,881,927 and 4,874,352 shows ball-type check valve tensioners with oil chambers and external oil make up lines. Other hydraulically operated tensioners using check valves and spring biased diaphragms for maintaining oil pressure above atmospheric pressure are shown in Inoue, et al, U.S. Pat. No. 4,909,777 and U.S. Pat. No. 4,911,679. All of the above hydraulically dampening tensioners differ substantially in construction and in operation from the tensioner described in this invention.

OBJECTS OF THE INVENTION

It is a broad object of this invention to provide an improved belt tensioner for belts used on pulleys.

A more particular object of this invention is to provide a more compact tensioner of reduced weight and volume.

An additional object of this invention is to provide a tensioner in which the design point tension and vibration dampening can be easily changed as desired for various applications.

A still further object of this invention is to provide a reliable tensioner which can be manufactured at low cost.

Still another object of this invention is to provide a tensioner that is simple to install and adjust if necessary to give the desired belt tension.

Another object of this invention is to provide a tensioner with substantial pulley linear movement while using high energy disk springs or high energy compression springs having relatively small displacements.

Yet another major object of this invention is to provide a tensioner whose belt load deflection characteristic can be changed by geometry changes from a positive to a neutral to a negative characteristic while using compression springs or a stable series arrangement of Belleville spring washers whose operation is limited to the positive load deflection characteristic regime.

An additional object of this invention is to provide a tensioner using disk springs whose operation involves a major reduction in the operating hysteresis and friction losses, normally associated with a stack of disk springs.

A specific object of this invention is to provide a tensioner that can give unidirectional hydraulic dampening.

A still further object of this invention is to provide a tensioner that can operate over a wide temperature range.

A still further object of this invention is to provide a tensioner in which closed cell elastomeric foam is used to reduce the pressure of the liquid within the tensioner housing due to the thermal expansion of the liquid.

SUMMARY OF THE INVENTION

Briefly, these and other objects of my invention are achieved by using a helical compression spring or multiple disk springs known as Belleville springs in series arrangement in a housing located on a support structure to rotate another structure pivotally mounted on the support structure. An idler pulley located on the rotatable structure bears against a belt to both tension it and dampen vibrations. The helical compression spring or disk springs operate on a plate rigidly attached to a movable shaft, which shaft bears directly or preferably indirectly through a thrust linkage on a shoulder of the rotatable structure. The disk springs or helical compression spring, a thrust assembly and shaft are mounted in a housing. The housing is substantially filled with liquid which dampens the movement of the rotatable structure by being forced to flow through a restriction in the thrust assembly and from one chamber to another inside the housing only as the shaft moves. Additionally, the thermal expansion of the liquid is substantially absorbed by the compression of a closed cell elastomeric foam insert in the housing. The constant diameter shaft passes through the housing and its end cap, it being sealed hydraulically at each end. This permits shaft movement to occur without any volume change inside the housing. The rotatable structure is pivotally mounted to the support structure with its rotational axis being displaced and perpendicular to the spring thrust axis. Initial rotation of the entire assembly can be provided by an angular slot containing a position lock screw to obtain the desired initial belt tension or preferably a specific rotation is given in a more simple manner by a fixed pin.

DESCRIPTION OF THE DRAWINGS

The subject matter of this invention is particularly pointed out and distinctly claimed in the concluding portion of the specification. The invention, however, both as to organization and method of operation, may best be understood by reference to the following description taken in conjunction with the claims and the accompanying drawings of which:

FIG. 4 is a front view of the tensioner assembly with a cross-section of the disk spring housing providing minimum belt tension;

FIG. 5 is a front view of the tensioner assembly with a cross-section of the disk spring housing providing maximum belt tension;

FIG. 6 is an enlarged cross sectional view of the disk spring housing, thrust shaft, linkage, and pulley arm pivot arrangement;

FIG. 7 is a front view of the tensioner assembly with a cross section of the helical spring housing providing minimum belt tension;

FIG. 8 is an enlarged partial side sectional view of the thrust shaft and linkage bearing on the pulley arm taken on line 2—2 of FIG. 5;

FIG. 12 is an enlarged cross sectional view of the disk spring housing, thrust shaft, linkage, and pulley arm pivot arrangement incorporating a ball check valve to give directional damping; and FIG. 13 is an enlarged view of the area "FIG. 13" of FIG. 12.

DETAILED DESCRIPTION OF THE INVENTION

In the discussion of an exemplary embodiment of the invention which follows, a specific geometry is shown appropriate for applying a torque to an idler pulley which can change position to continuously tension a belt.

Figure 1:
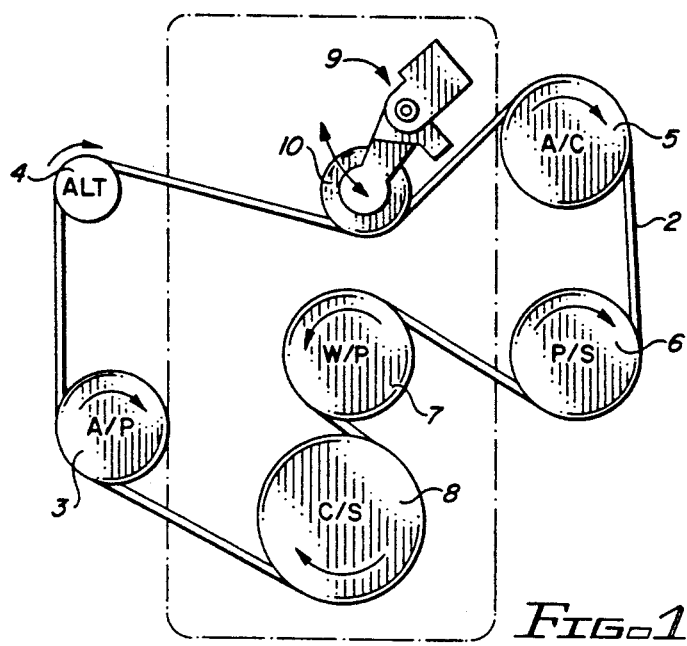
FIG. 1 is a generalized view representing an engine with an array of belt driven accessories utilizing a tensioner of this invention.
Figure 2:
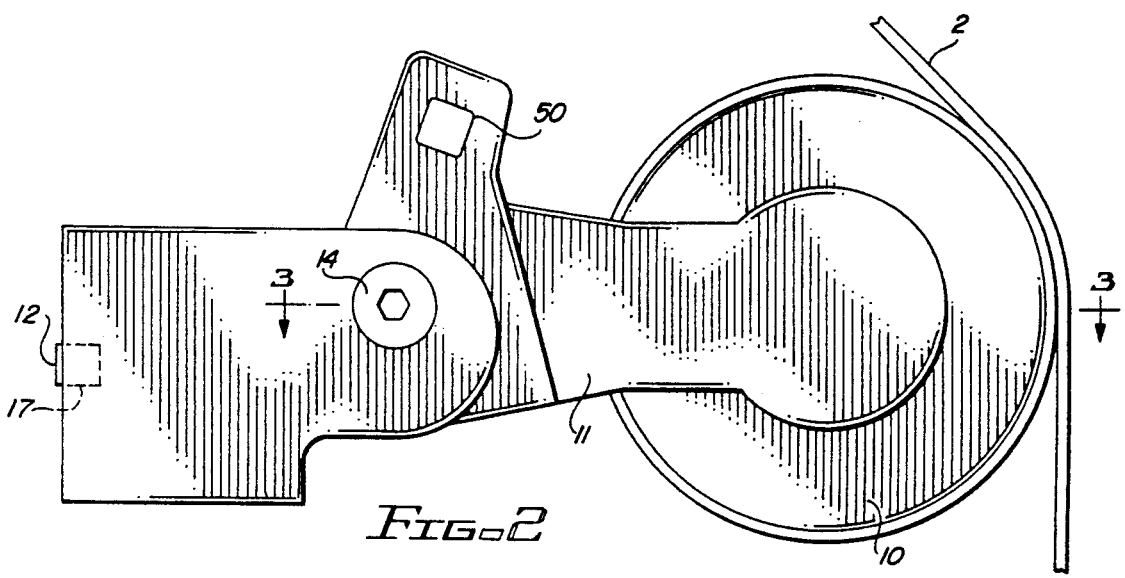
FIG. 2 is a front view of the tensioner assembly operating at a mid point position.

Referring now to FIG. 1, a generalized view of an engine 1 having an array of accessories (represented by the respective pulleys) driven by a serpentine belt 2 is shown. The accessories, which are shown as exemplary, include air pump 3, alternator 4, air conditioning compressor 5, power steering pump 6, and water pump 7 (which may carry a fan) all driven by pulley 8 which is coupled to the engine crankshaft. The tensioner of this invention is shown generally at 9 with its idler pulley 10, and operates to provide the required belt tension.

The tensioner is shown in an exemplary fashion to be located between the alternator 4 and air conditioning compressor 5.

At the outset it should be noted that the operating belt tension may not be and usually is not equal to the stationary belt tension. The change between the operating and stationary belt tension becomes larger as the tensioner idler pulley 10 is positioned closer to the drive pulley on its slack (or lower tension) belt side. Changes in the power consumption of accessories will also normally affect the operating belt tension relative to the stationary belt tension as is known by those skilled in the art. The tensioner idler pulley is usually positioned to increase the warp angle on one or two pulleys and thus normally operates on the back side of the belt. The back side of the belt is usually flat permitting a simple construction of the idler pulley 10. The belt length change with operation which can be due both to torque and speed as well as operating temperature must be considered to determine the necessary tensioner idler pulley displacement with operation. Finally, belt length change with belt wear (normally pulley wear is not significant) and the significance of belt vibrations due to changes in crank shaft torsional vibration and belt loads must also be considered. Belts employing higher modulus cords such as "Kevlar" result in very little extension of length due to the operating tension (typically only a 0.2 percent change in length). Additionally, the negative coefficient of expansion with temperature of higher modulus cords of Kevlar can be useful to give some compensation for tension requirements at higher power operation.

Figure 3:
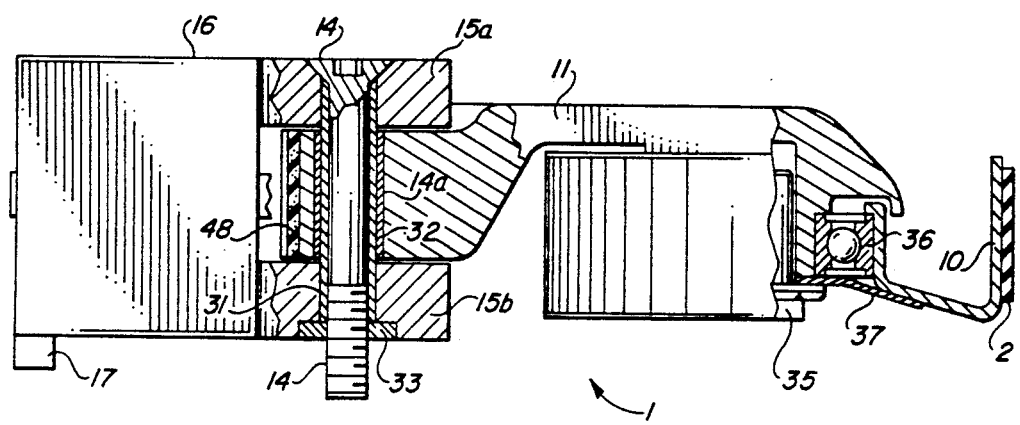
FIG. 3 is a side sectional view of the pulley, pulley arm, bearings, and tensioner mounting arrangement using a fixed pin taken on line 1—1 of FIG. 2.

Referring to FIGS. 2, 3, 4 and 5, one embodiment of the tensioner assembly includes idler pulley 10 rotatably mounted to arm 11 by means of bolt 35 which bears on the hub of bearing 36 through washer 37. Arm 11 with its attendant pulley is pivotally mounted to tensioner support arms 15a, 15b by means of pivot bolt 14. Support arms 15a and 15b extend from the housing 16 which contains disk springs 18, moveable shaft 12, thrust assembly 19, and end plate 20. As best shown in FIG. 3, arm 11 and adjacent tensioner supports 15a, 15b are provided with opening 14a which is lined with structural tube 31, sleeve bearing 32 and bearing washer 33. Pivot bolt 14 is inserted through opening 14a and fastened to a base structure such as engine block 1. Thus idler pulley arm 11 is permitted to freely pivot on bolt 14 but is restrained from moving axially on pivot bolt 14.

Tensioner supports 15a, 15b and its spring housing 16 may be rigidly positioned on an engine 1 or other appropriate attachment by means of pin 17 and bolt 14. The pivotal mounting of arm 11 on supports 15a and 15b allows idler pulley 10 to move relative to supports 15a and 15b and thus the belt 2 can vary position while being subjected to a force by pulley 10. The pulley arm 11 may be rotated by an external force using the square socket wrench hole 50 and appropriate wrench (not shown) to compress the disc springs 18 and install the belt 2 as indicated by FIGS. 4 and 5. In FIG. 4, pulley 10 is shown in a position corresponding to the maximum possible subsequent movement of belt 2 relative to tensioner 9: that is, the tensioner assembly is exerting minimum tension on belt 2. Additional force on idler pulley 10 by belt 2 will move shaft 12 and thrust assembly 19 in a direction in housing 16 which results in a compression of disk springs 18 to a flat position as shown in FIG. 5 by rotation of support arm 11 on pivot bolt 14 which in turn causes the same angular rotation of concave shaped shoulder 11a of arm 11 against shaft 12 through a thrust linkage 34. Shoulder 11a is provided with pin 13 which bears against the linkage 34 which contains pin 46 bearing on the end of shaft 12. In FIG. 5, pulley 10 is shown in a position corresponding to the maximum movement of belt 2 relative to tensioner 9 and the tensioner is exerting maximum tension on belt 2. It will be seen that disk springs 18 in FIG. 5 are fully compressed.

As shown best in FIG. 6 with the tensioner pulley in an intermediate position, the disk spring housing 16 contains a series of coned disk springs 18, stacked in series and surrounding movable thrust assembly 19 and non-movable end plate 20. Thrust assembly 19 is generally cylindrical in shape and provided with opening 19a to allow passage of shaft 12 through the assembly. One end of assembly 19 is provided with shoulder 42. The assembly is secured to the shaft by means of retaining pin 23 which passes through the shaft and plate 22 which is an integral part of the assembly. Thus, movement of the shaft 12 results in movement means in said thrust plate whereby liquid flow between said chambers is restricted for hydraulic dampening wherein axial movement of said shaft and thrust plate is controlled by the compression of said spring means. The disk springs 18 have internal diameters which are slightly larger than the outer diameter of the thrust assembly, resulting in a passage 24 between the disk springs 18 and assembly 19. When assembled in the housing 16, each disk spring bears on another disk spring at either its inner or outer diameter to effectively form two separate chambers 27 and 28 in the housing 16. The two separate chambers 27, 28 are connected by a flow channel 21 in the thrust assembly and the liquid flow control passage 26 contained in plate 22. The two chambers 27, 28 vary in size as the shaft 12 moves due to changes in the total deflection of the disk springs 18. A liquid 25 of suitable viscosity fills the chambers 27 and 28 with a closed cell elastomeric foam insert 70 having a volume typically of about 10% of the total oil or liquid volume 25. The closed cell foam insert 70 varies in size with changes in the volume of the oil 25 due to temperature changes. Oils typically have a volumetric expansion coefficient of about 0.00035 per degree Fahrenheit. Thus, if the operating temperature varies from 60° F. to 200° F., the volume of oil would increase by 0.00035 (200−60)=0.049 or about 5%. Such an increase in oil volume would decrease the volume of a closed cell elastomeric foam insert 70 to about 50% of its original volume. Using a typical soft closed cell rubber foam having a density of about 10 pounds per cubic foot with the basic rubber density of 90 pounds per cubic foot then gives an oil pressure change to about 34 psia from 15 psia (pounds per square inch absolute). Thus, the closed cell foam rubber insert 70 permits the thermal expansion of the oil 25 to be contained in the housing 16 with relatively small changes in oil pressure due to normal changes in the operating temperature. Without the compressible closed cell insert, a housing filled with oil would experience an internal pressure of about 10,000 psia upon increasing in temperature from 60° F. to 200° F. if it did not rupture or leak. The closed cell elastomer foam contains an inert gas such as nitrogen that fills the cells. Such an elastomer is subject to various degrees of compression set when compressed by a weight in air. This is due to the permeability of the elastomer giving diffusion of the inert gas from the cells when there is a pressure differential between the gas in the cells and the outside air. However, when the closed cell elastomer is immersed in a liquid and compressed by changes in the liquid pressure, no pressure differential exists across the elastomeric membranes of the closed cell material. Hence, there is no gas diffusion out of the closed cells and no compression set in the closed cell insert. The overall volume for liquid inside the housing 16 does not change with movement of the shaft 12 since the shaft is of fixed diameter and passes through the front face 30 of the housing 16 and end plate 20, it being sealed at both ends by "O" rings—29 in the housing front face 30 and 38 in end plate 20.

End plate 20 is retained in the housing 16 by a retaining ring 46. "O" ring 47 is used to seal the housing 16 to the end plate 20. A threaded plug 48 is provided in the end plate to permit filling the inside of the housing with a viscous liquid 25. Chamber 28 includes a volume of the annulus 24 located between the spring disks as well as the volume between end disk spring 18b and end plate 20. Chamber 27 includes the volume of the annulus 40 located between the disk springs and the interior wall of housing 16 as well as the volume between the top disk spring 18a and the housing front face 30. The outside diameter of the thrust plate 19, while slightly smaller than the internal diameter of the disk springs 18 still serves to substantially locate the disk springs radially in the housing 16. The top disk spring 18a engages and seals on a shoulder 42 of the thrust assembly 19. Shoulder 42 also incorporates slots 43 that serve as flow passages in the maximum spring extended position as shown in FIG. 4. It should be noted that the maximum movement of the disk springs 18, pulley arm 11 and pulley 10 may be precisely controlled by the length of the thrust assembly relative to axial length of the chamber in which it is located. The unique useage of the disk springs 18 to form a variable position wall between the two chambers 27 and 28 minimizes the coulomb frictional losses in the system and permits a more ideal fluid dampening characteristic by forcing the substantially incompressible liquid 25 to flow through flow control passage 26. The flow dampening characteristic can be changed significantly by geometry changes in the flow control passage 26. The entrance 44 or exit 45 of passage 26 as shown in FIG. 6 gives substantially equal liquid flow pressure drops in either flow direction in the passage 26 resulting in a substantially non-directional uniform dampening characteristic except for a slight effect caused by the closed cell insert 70. While one geometry is shown for the liquid control passage 26 is shown, wide changes in the directional dampening characteristics are possible by changing the shape of the passage 26 and principally its inlet 44 or outlet 45, as is well known in the art.

An alternate spring means is shown in FIG. 7 where a helical compression spring 60 (typically a "die" spring using rectangular cross sectional wire for large forces) is employed to bear on the shoulder 61 of a thrust assembly 62. Shoulder 61 of the assembly incorporates an "O" ring seal 63 at its periphery to cause substantially all fluid flow from one side of the thrust assembly 62 to the other to be forced through the liquid control passage 64 when spring 60 is compressed by the belt 2 acting on the pulley 10 and rotating the pulley arm 11 around the bolt 14. The operation of the other tensioner elements is as previously described using coned disk springs 18.

The same basic arrangement as shown in FIGS. 6 and 7 may also incorporate a ball check valve and integral leak flow restriction to obtain the maximum hydraulic dampening away from the belt engaging means and opposed to the direction of force of said spring means. Ball check valves giving such a specific maximum hydraulic dampening direction are shown in many patents; i.e., Wilson, U.S. Pat. Nos. 4,411,638; 4,696,664; Foster et al, U.S. Pat. No. 4,509,935; Okabe et al, U.S. Pat. Nos. 4,790,796; 4,798,563; Suzuki U.S. Pat. Nos. 4,874,352; 4,881,927; Inoue et al, U.S. Pat. Nos. 4,909,777; 4,911,679; and Kawashima et al, U.S. Pat. No. 4,940,447. A check valve arrangement is shown in FIG. 12, Here, an increase in the belt tension causes the shaft 12 to move compressing the disc springs 18 which causes the liquid pressure in chamber 28 to increase over the pressure in chamber 27. The initial amount of movement of the belt loaded pulley due to an increase in belt tension is quite small due to the incompressibility of the oil in chamber 28. The closed cell elastomeric insert 70 is now located in chamber 27 to minimize the initial amount of movement of the belt loaded pulley due to an increase in belt tension. The spring loaded ball 65 is pushed against the valve seat 66, restricting the hydraulic fluid flow from chamber 28 to 27. The valve seat 66 incorporates a small local triangular groove 67 (typically about 0.002-0.004 inch deep on the surface contacted by the ball 65 as shown in FIG. 13). This permits a very minor hydraulic fluid flow to occur even with the ball seated which then allows the shaft 12 to gradually take a new equilibrium position wherein the force due only to the compression of the springs once again balances the belt load on the pulley through the pulley arm arrangement. Conversely, a reduction of belt load causes the shaft 12 to move reducing the compression of the disc springs 18 which causes the liquid pressure in chamber 27 to exceed the liquid pressure in chamber 28. The spring 68 is held by a ported retainer 69 and is sized to give a minor force on the ball so that a small increase in pressure in chamber 27 over that in chamber 28 unseats the ball 65, thus permitting a relatively large liquid flow to occur. This then permits a rapid movement of the pulley arm toward the belt to take up any reduction in the belt tension.

As shown best in FIG. 6 and FIG. 8, one end of shaft 12 bears on pin 46 retained in linkage 34. Linkage 34 bears on pin 13 retained in shoulder 11a of the arm 11. While the rounded end of the shaft 12 could be used to directly bear on the shoulder 11a, the use of the linkage 34 and hardened pins 13 and 46 greatly increases the bearing surface area and decreases the bearing contact pressure accordingly for a thrust load given by the spring means 18 or 60. A pocket of lubricant such as grease 47 is retained in the region enclosing the linkage 34 by elastomeric seals 48 and 48a compressed between the pulley arm 11 and housing 16. Tests with this construction show that fretting corrosion and wear on the pins 13 and 46 and shaft 12 are substantially eliminated for the life of the tensioner employing such a lubricated bearing system.

Figure 9:
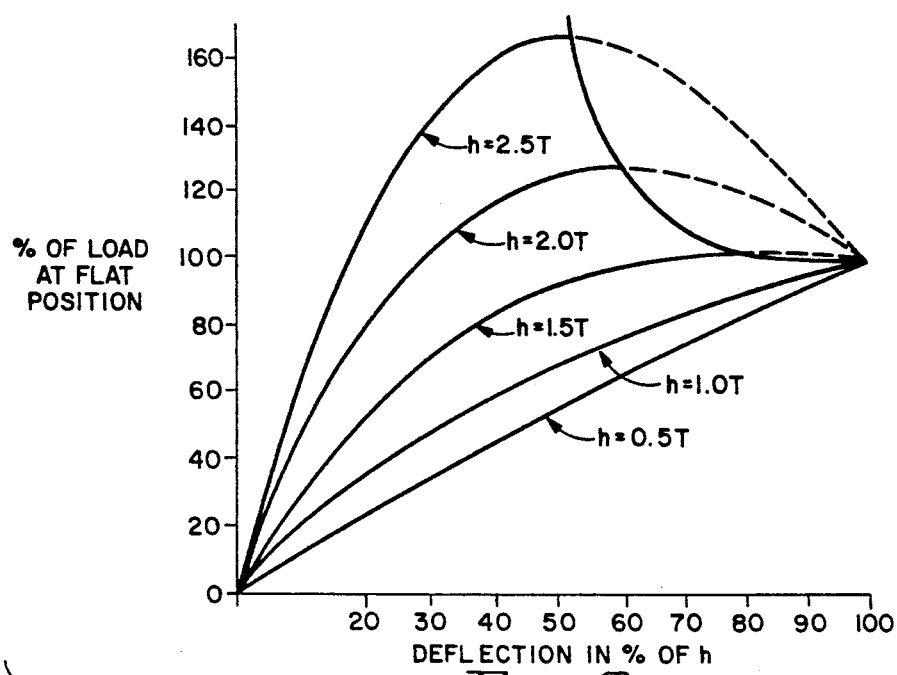
FIG. 9 is a graph showing the deflection versus load for various coned disc springs.
Figure 10:
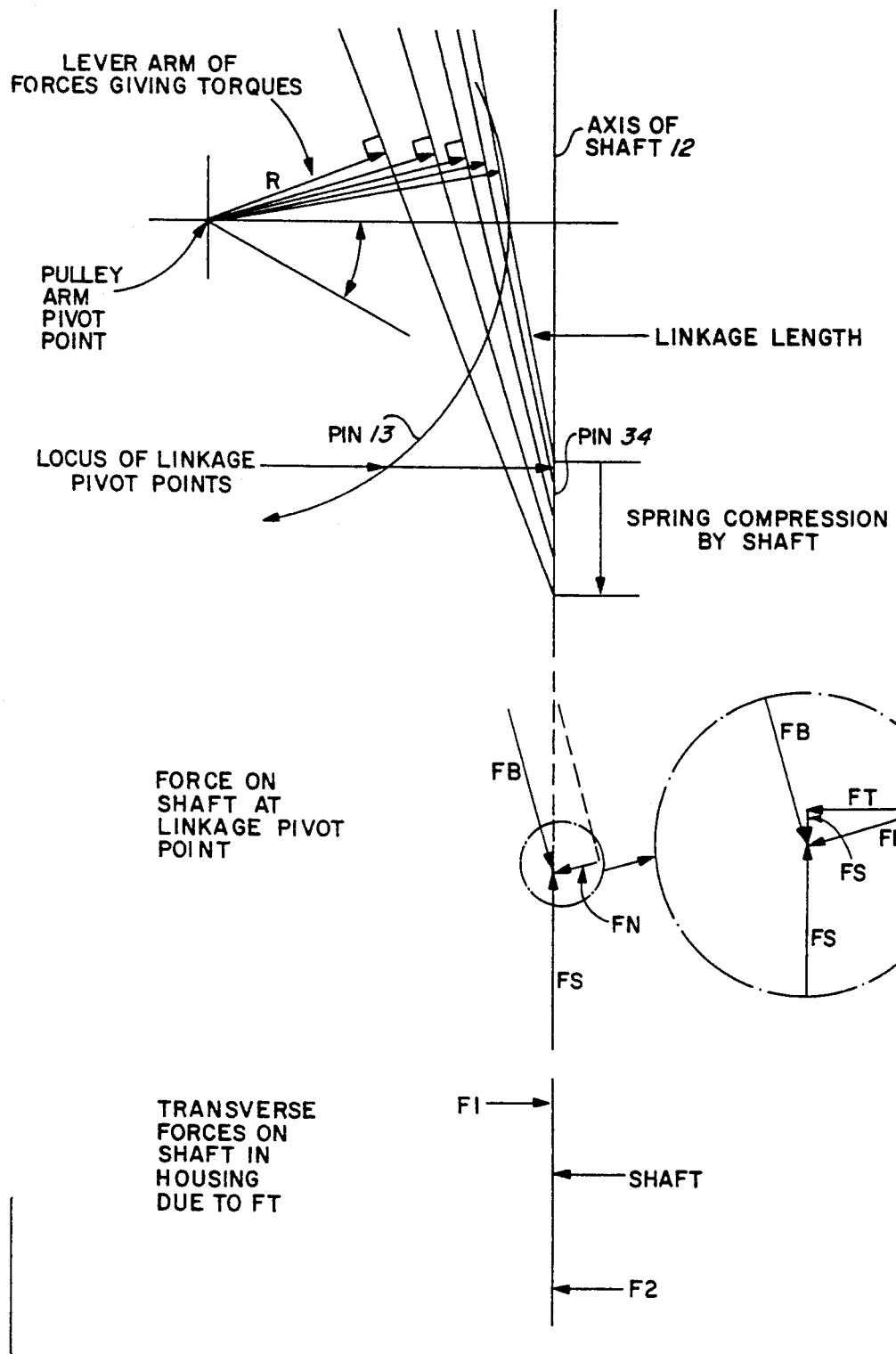
FIG. 10 is a diagram explaining the force and torque relationships in the tensioner.

A wide range of pulley arm force versus its rotation or deflection characteristic is available from this tensioner using relatively small changes in the size of the coned disk springs and/or geometry changes of the shaft 12 position relative to the pulley arm 11 pivot point. This is illustrated in FIGS. 9 and 10. The deflection of coned disk springs vary substantially as shown in FIG. 9 where T is the thickness of a disk spring and h is the axial displacement to the flat position or unload cone height. Coned disk springs having h/T ratios less than the square root of 2.0 (1.414) have only a positive load deflection characteristic, i.e., increasing disk spring deflection requires increased force. However, coned disk springs having h/T ratios greater than 1.414 have a negative load deflection characteristic, i.e., increasing disk spring deflection corresponds to decreased force over a portion of their operating range as shown in FIG. 9, region 51 as dashed lines. The solid lines to the left hand side of line 52 all have a positive load deflection characteristic. It is usually impossible to operate stably in region 51 of FIG. 9 with a series of stacked disk springs. Due to small but inevitable manufacturing differences, one of series of a stack of disk spring when operating in the negative load deflection regime will deflect slightly more than the other washers, resulting in a lower load being capability of that element so that it may be driven to a flat or over flat position with adjustment of the other disk springs to less deflection. This procedure can repeat with other disk springs and when considered with belt oscillations due to other causes gives an impractical belt tensioner. However, if the operation of the disk springs is limited by a stop so as to always operate in the positive load deflection characteristic regime, i.e., to the left side of line 52 in FIG. 9. no erratic deflections of the disk springs will occur that would affect the belt tensioner. Further, it has been found that if the disk spring deflection is limited to a range from approximately 50% of the deflection at the maximum load point up to the maximum load point that the disk spring load varies by only approximately 20% of the maximum load irrespective of the disk spring cone height to thickness ratio when considering those disk springs that have operation in the negative load deflection characteristic region when operating to the flat position. If the 50% deflection from the maximum load point deflection is used for the disk springs, the geometric arrangement of a spring thrust axis displaced and perpendicular to the rotational axis or pivot of belt tensioning means permits various characteristic curves for the force on the belt by the idler pulley supported on the belt tensioner versus the deflection of disk springs.

Attention is directed to the geometry and linkage force relationships as shown in FIG. 10 which shows how it is possible to generate a pulley arm negative load deflection characteristic while using coned disk springs operating stably with a positive load deflection characteristic. Shaft 12 operated by the disk springs is held in a housing which is rigidly related to the pulley arm pivot point. Compression of the stack of coned disk springs by the shaft results in an increasing force FS which using the shaft 12 axis (pin 34) at a larger radius than the pulley arm pin 13 radius gives a slightly smaller FB which as shown can have significantly lower lever arms, R, to pulley arm pivot point. Since the torque on the pulley arm is the product of FB times R, the resulting decrease in R with spring compression affects the pulley arm torque more than the increases in disk spring force, FS.

Figure 11A:
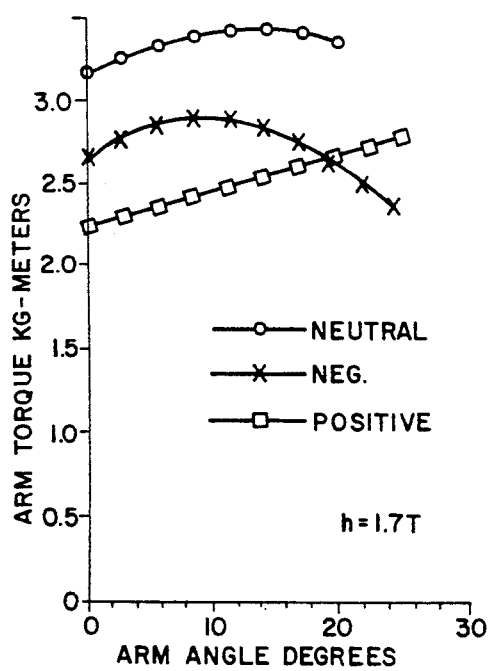
FIG. 11A and 11B are graphs showing typical variations in the force on the belt as a function of the deflection of the spring disk washers up to the point of maximum spring load for two different cone height to disk thickness ratios.
Figure 11B:
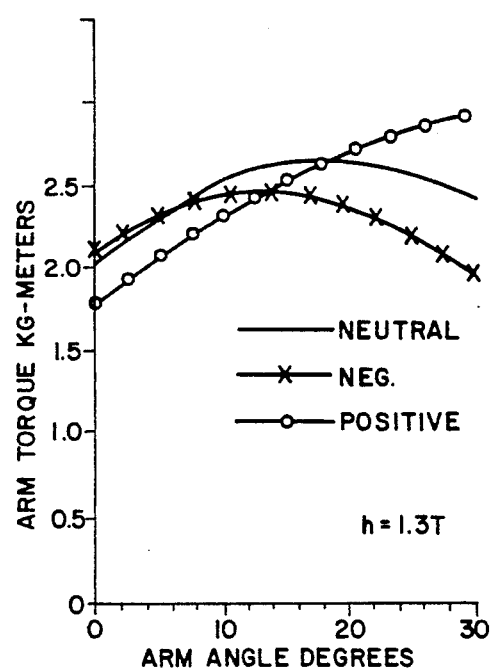

With the rigid relationship between the shaft 12 axis and the pulley arm pivot point, the shaft is subjected to a transverse force FT resolved from FN as shown in FIG. 10. The transverse force FT exists at pin 34 on which shaft 12 bears, thus giving a torque load on the shaft. This results in transverse forces on the shaft at the location of the shaft 12 entering the housing 16, i.e., F1, and at the location of the shaft 12 leaving the back plate 20, F2. However, the forces F1 and F2 are normally quite small compared to FS. Typical operating characteristics are shown in FIGS. 11A and 11B for two different h/T values. Here, a series stack of seven disk springs having a thickness of 1.25 mm., O.D. of 45 mm., I.D. of 22.4 mm., using an operating range from 34 to 68% of flat (the maximum load point) with a cone height to thickness ratio of 1.7 was used to give the results in FIG. 11A by shifting slightly the axis of shaft 12 relative to the pulley pivot point. Also, as shown in FIG. 11B, a similar series stack using a cone height to thickness ratio of 1.3 and operating range from 50% to 100% of flat (the maximum load point) gives a similarly wide range of operation in the force deflection characteristics again by shifting the axis of shaft 12 relative to the pulley pivot point.

Although the invention has been described in the exemplary environment of multiple engine driving rotating accessories, those skilled in the art will appreciate that other environments involving belts and pulleys are also contemplated.

Thus, while the principals of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A tensioner for a power transmission belt adapted to be operated in an endless path, said tensioner comprising:
    support means which can be mounted in a fixed position relative to said belt;
    belt engaging means carried by said support means and being pivotally mounted to said support means;
    an enclosed housing having a side wall and end walls and rigidly connected to said support means and adjacent to said belt engaging means, said housing containing mechanical spring means and hydraulic dampening means located on a movable shaft positioned within said housing and passing through said end walls, said housing containing a liquid;
    said housing further including a first chamber and a second chamber, said chambers being separated by a thrust assembly rigidly secured to said shaft and movable therewith in said housing and bearing on said spring means, whereby longitudinal movement of said shaft and thrust assembly causes a variation in the respective volumes of said chambers;
    an end wall of said housing located adjacent said belt engaging means being provided with an opening axially aligned with said shaft and through which a portion of said shaft can move and contact said belt engaging means, whereby linear movement of said shaft results in angular movement of said belt engaging means, the ratio of said angular movement to said linear movement being greater than two.

2. The tensioner of claim 1 wherein the separation of said chambers is provided by said spring means.

3. The tensioner of claim 2 wherein said spring means comprises disk springs stacked in series.

4. The tensioner of claim 3 wherein said springs are provided with central openings of sufficient size to accommodate said shaft and permit flow of fluid.

5. The tensioner of claim 4 wherein said springs have a positive load deflection characteristic, and means to limit the compression of said springs so that said springs operate substantially only in a positive load deflection.

6. The tensioner of claim 5 wherein said springs have a cone height to thickness ratio less than about the square root of 2.

7. The tensioner of claim 6 wherein said springs operate only between about maximum spring load to about fifty percent of said maximum spring load throughout the normal tensioning range of movement of said belt engaging means relative to said support means.

8. The tensioner of claim 2 wherein said chambers are further defined by said thrust plate together with the inner and circumferential contact of the bearing surfaces of said disk springs on each other and on said end walls of said housing.

9. The tensioner of claim 1 wherein contact between said shaft and said belt engaging means is provided by a pin linkage assembly.

10. The tensioner of claim 1 wherein said spring means is a helical compression spring.

11. The tensioner of claim 10 wherein said spring is rectangular in cross section.

12. The tensioner of claim 10 wherein contact between said shaft and said belt engaging means is provided by a pin linkage assembly.

13. The tensioner of claim 1 wherein an elastic structure is provided to seal and retain a lubricant about contacting surfaces between said shaft and said belt engaging means.

14. The tensioner of claim 1 wherein said hydraulic dampening means located on a moveable shaft operatively associated with the belt engaging means will dampen the movement of said movable shaft with a greater restricting force when said shaft is moved in a direction that is opposed to the urging force of spring means bearing on the movable shaft and in a direction away from the belt by the belt engaging means as compared to the movement of said shaft in the opposite direction.

15. The tensioner of claim 14 wherein said hydraulic dampening means includes a ball check valve.

16. The tensioner of claim 15 wherein the valve seat of said ball check valve includes a groove to permit a small amount of hydraulic fluid flow when said ball is seated.

17. A tensioner for a power transmission belt adapted to be operated in an endless path, said tensioner comprising:
    support means which can be mounted in a fixed position relative to said belt;
    belt engaging means carried by said support means;
    an enclosed housing having a side wall and end walls rigidly connected to said support, a movable shaft, a portion of which is positioned within said housing and passing through at least one of said end walls, said portion of said shaft positioned within said housing being operably connected to a spring loaded thrust assembly which essentially separates said housing into two chambers filled with a liquid, whereby longitudinal movement of said shaft and thrust assembly causes a variation in the respective volumes of said chambers and movement of liquid from one of said chambers to the other of said chambers;
    the portion of said shaft which is positioned outside of said housing being in contact with said belt engaging means, whereby movement of said shaft results in movement of said belt engaging means;

and an insert of closed cell elastomeric foam located in at least one of said liquid filled chambers to reduce the pressure of the liquid within said tensioner housing due to thermal expansion of said liquid.

18. The tensioner of claim 17 wherein said foam contains an inert gas.

19. The tensioner of claim 18 wherein said foam has a volume of about 10% of the volume of said liquid at standard sea level atmospheric pressure.

20. The tensioner of claim 19 wherein said foam has a density of about 10 pounds per cubic foot at standard sea level atmospheric pressure.

21. The tensioner of claim 1 wherein at least one of said liquid filled chambers contains an insert of closed cell elastomeric foam to reduce the pressure of the liquid within said tensioner housing due to thermal expansion of said fluid.

22. The tensioner of claim 21 wherein said foam contains an inert gas.

23. The tensioner of claim 22 wherein said foam has a volume of about 10% of the volume of said liquid at standard sea level atmospheric pressure.

24. The tensioner of claim 23 wherein said foam has a density of about 10 pounds per cubic foot at standard sea level atmospheric pressure.

* * * * *